(12) United States Patent
Wang

(10) Patent No.: US 8,161,240 B2
(45) Date of Patent: Apr. 17, 2012

(54) CACHE MANAGEMENT

(75) Inventor: Wenguang Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1046 days.

(21) Appl. No.: 11/870,325

(22) Filed: Oct. 10, 2007

(65) Prior Publication Data

US 2009/0100224 A1 Apr. 16, 2009

(51) Int. Cl.
*G06F 12/00* (2006.01)

(52) U.S. Cl. ........ 711/118; 711/133; 711/135; 711/136; 711/144

(58) Field of Classification Search .................. 711/118, 711/133, 135, 136, 144, 153, 154, 170, 173, 711/129, 202, 205, 206, 207; 710/68; 714/48, 714/6, 7; 345/555

See application file for complete search history.

(56) References Cited

U.S. PATENT DOCUMENTS

| | | | | |
|---|---|---|---|---|
| 5,829,023 A * | 10/1998 | Bishop | ............. | 711/118 |
| 6,163,773 A * | 12/2000 | Kishi | ............. | 706/16 |
| 2005/0193160 A1* | 9/2005 | Bhatt et al. | ............. | 711/3 |
| 2008/0147974 A1* | 6/2008 | Madison et al. | ............. | 711/118 |

* cited by examiner

*Primary Examiner* — Kevin Ellis
*Assistant Examiner* — Mehdi Namazi
(74) *Attorney, Agent, or Firm* — Fish & Richardson P.C.

(57) ABSTRACT

Systems, methods and computer readable media for cache management. Cache management can operate to organize pages into files and score the respective files stored in a cache memory. The organized pages can be stored to an optical storage media based upon the organization of the files and based upon the score associated with the files.

25 Claims, 5 Drawing Sheets

CACHE MANAGEMENT

TECHNICAL FIELD

The subject matter of this application is generally related to memory management.

BACKGROUND

Modern computers can include a cache memory to temporarily store information previously used in an application. A memory size associated with the cache memory is often limited. Many computers can include, for example, in an operating system of the computer, a cache management algorithm to manage the information stored in the cache memory. If the cache memory is full, the computer can execute the cache management algorithm to select a portion of data in the cache to be removed to make room for new data used by the application.

One example of a cache management algorithm is a least recently used (LRU) algorithm. If the cache memory is determined to be full, the operating system using the LRU algorithm can select to remove the least recently used data from the cache memory based on the inference that the least recently used data is the least likely to be accessed next. However, this inference is often false. Other cache management algorithms can also be used. Some examples are a most recently used (MRU) algorithm, a pseudo-LRU algorithm, and a least frequently used (LFU) algorithm.

In some examples, when the computer is writing to an optical media (e.g., a recordable compact disc (CD-R), a recordable-Digital Versatile Disc (DVD), a high definition DVD-R, a blu-ray recordable disc, etc.), some data (e.g., user data and metadata) can be kept in the cache memory before being written to the optical media at a later time. The cache management algorithm can affect the location where the data is being written in the optical media based on the management algorithm used (e.g., LRU, MRU, pseudo-LRU, LFU, etc.). Additionally, the location of the data in the optical media can affect read performance of the data. Thus, the effectiveness of the cache management algorithm can affect the read and write performance of the optical media.

SUMMARY

Systems, methods and computer readable media for cache management are provided. Example systems can include a cache, a cache management module and a statistics collection module. The cache can operate to store pages. The cache management module can associate each of the pages with a particular file from a number of files. The statistics collection module can collect statistics on the plurality of files. The statistics can include, among others, a number of pages associated with a file, a most recent access time associated with the file, and a file write frequency. The cache management module can further determine when the cache is full and assign a score to each of the files in the cache based upon the collected statistics associated with the files. The cache management module can thereafter write one or more files to an optical storage media based upon the assigned scores associated with each of the files.

Example methods for cache management can include: collecting statistics associated with a cache storing a plurality of pages respectively associated with a plurality of files, the statistics comprising a number of pages associated with a file, a most recent access time associated with the file, and a file write frequency; assigning a score to each of the plurality of files based upon the statistics; identifying a highest scored file based upon the scores associated with each of the plurality of files; and, writing the highest scored file to an optical storage media.

Other implementations are disclosed, including implementations directed to systems, methods, apparatuses, computer-readable mediums and user interfaces.

DETAILED DESCRIPTION

Figure 1:
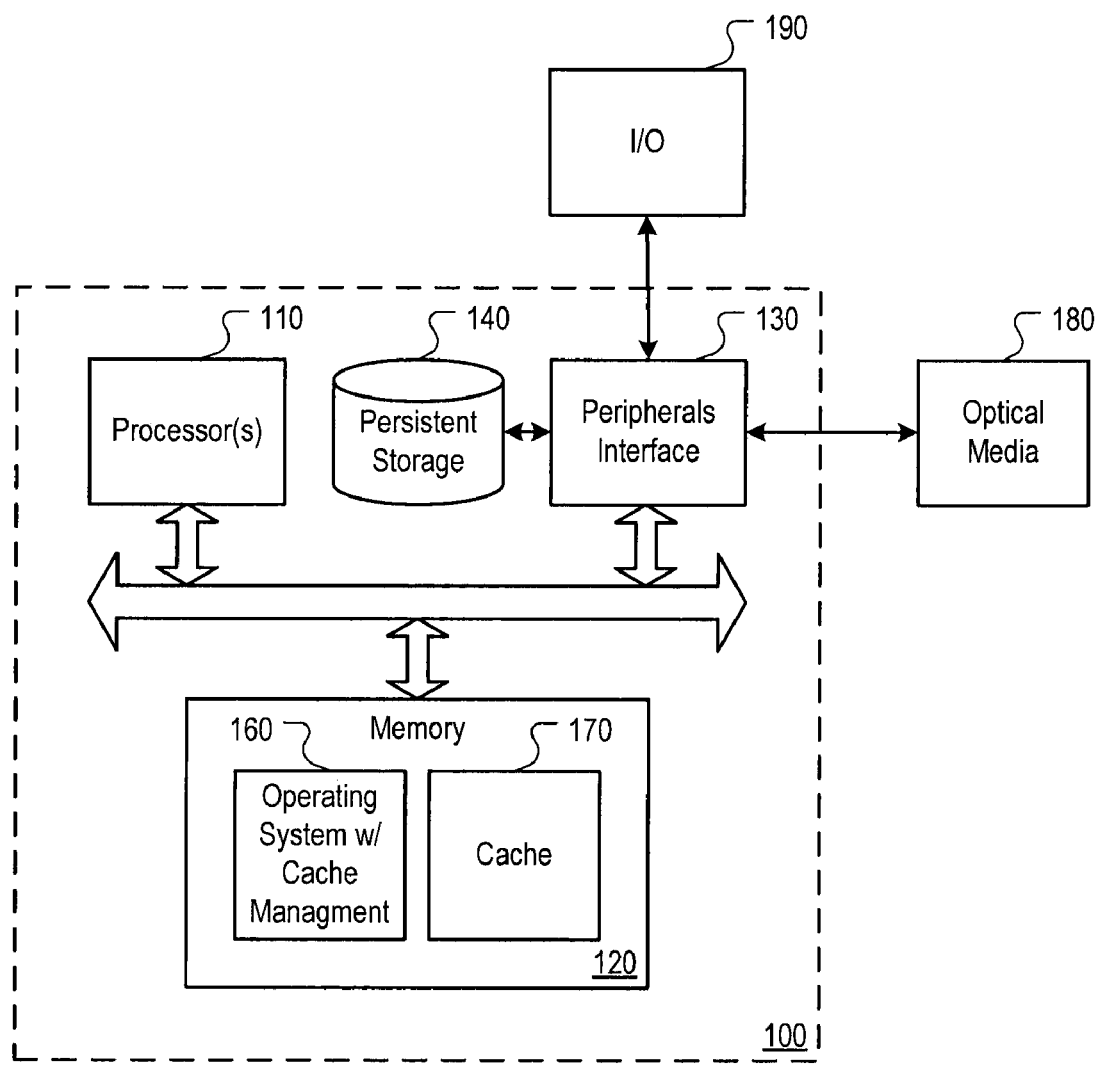
FIG. 1 is a block diagram showing an example computer system having an operating system with cache management.

FIG. 1 shows an example computer system 100 that includes one or more processors 110, a memory 120, and a peripherals interface 130. For example, the processors 110 can include a central processing unit (CPU). In some examples, the processors 110 can also include one or more coprocessors, such as a digital signal processing processor, a math coprocessor, and/or a graphical processing unit (GPU). In the depicted example, the processor 110 can access the volatile memory 120 and the peripherals interface 130 using a data bus.

In some implementations, peripheral devices (e.g., optical media 180, I/O devices 190) can be connected to the computer system 100 via the peripherals interface 130. In some examples, the peripherals interface 130 can include a Recommended Standard (RS) 232 interface, a Universal Serial Bus (USB) interface, a FireWire interface, an Ethernet interface, a Small Computer System Interface (SCSI) interface, and/or other communication interfaces. Using the peripherals interface 130, the computer system 100 can communicate with input/output (I/O) device(s) 190 (e.g., a keyboard, a mouse, printer device, and/or other peripheral devices), persistent storage 140 (e.g., a hard drive, flash memory, etc) and an optical media 180 (e.g., a compact disc (CD), a Digital Versatile Disc (DVD), a high definition DVD, a blu-ray DVD, etc.). For example, the computer system 100 can receive data from the optical media 180 via the peripherals interface 130.

In some implementations, the volatile memory 120 can include an operating system 160 with cache management, and a cache 170. For example, the operating system 160 can load applications and/or data from the persistent storage 140 (e.g., a hard disk drive or a flash memory) to the volatile memory 120 (e.g., a random access memory (RAM)). In some implementations, the operating system 160 can store a copy of the loaded data in the cache 170. In various instances, a software application may request to access a previously loaded data from the persistent storage 140. If the requested data is stored in the cache 170, the operating system 160 can retrieve the data from the cache 170 for the software application as if it is retrieved from the persistent storage 140.

In some implementations, the operating system 160 can operate to store and organize data in a file system format on the optical media 180. Some examples of the file system format used by the optical media 180 can include a Universal Disk Format (UDF) with virtual partition and other file systems that can adjust data during a write operation, such as, for example, log-structured file system (LFS) and various file systems used for flash memory. For example, based on the file system format of the optical media 180, the operating system 160 can use the optical media 180 as a regular disk (e.g., a floppy disk) so that the files and folders can be added to and removed from the optical media 180.

During a write operation to the optical media 180, some data, such as user data and metadata, can be stored in the cache 170 before being written to the optical media 180. In some implementations, the operating system 160 can control the write operation by managing the data stored in the cache 170. For example, the operating system 160 can include a cache management module operable to determine which portion of the data is to be written to the optical media 180. In some implementations, the operating system 160 can use the cache management module to organize the cache 170 so that data belongs to a same file is stored in the optical media 180 together in a sequential order. Accordingly, using such a cache management module can reduce workloads (e.g., data search time) for reading back the data and can improve read performance of the optical media 180.

In some implementations, the optical media 180 can be used to extend the size of the cache 170. For example, when a cache is filled, an operating system 160 can use a cache management to move data from the cache 170 to the optical media 180. In some implementations, the operating system 160 can be used to collect statistics based on the usage of various pages in the cache 170. Cache management can use the statistics to predict which pages are least likely to be accessed in the near term, and therefore are the best candidates for moving to the optical media 180. In some implementations, the optical media 180 can be used as a second layer of extensible cache when both available cache 170 and persistent storage 140 is exhausted.

Figure 2:
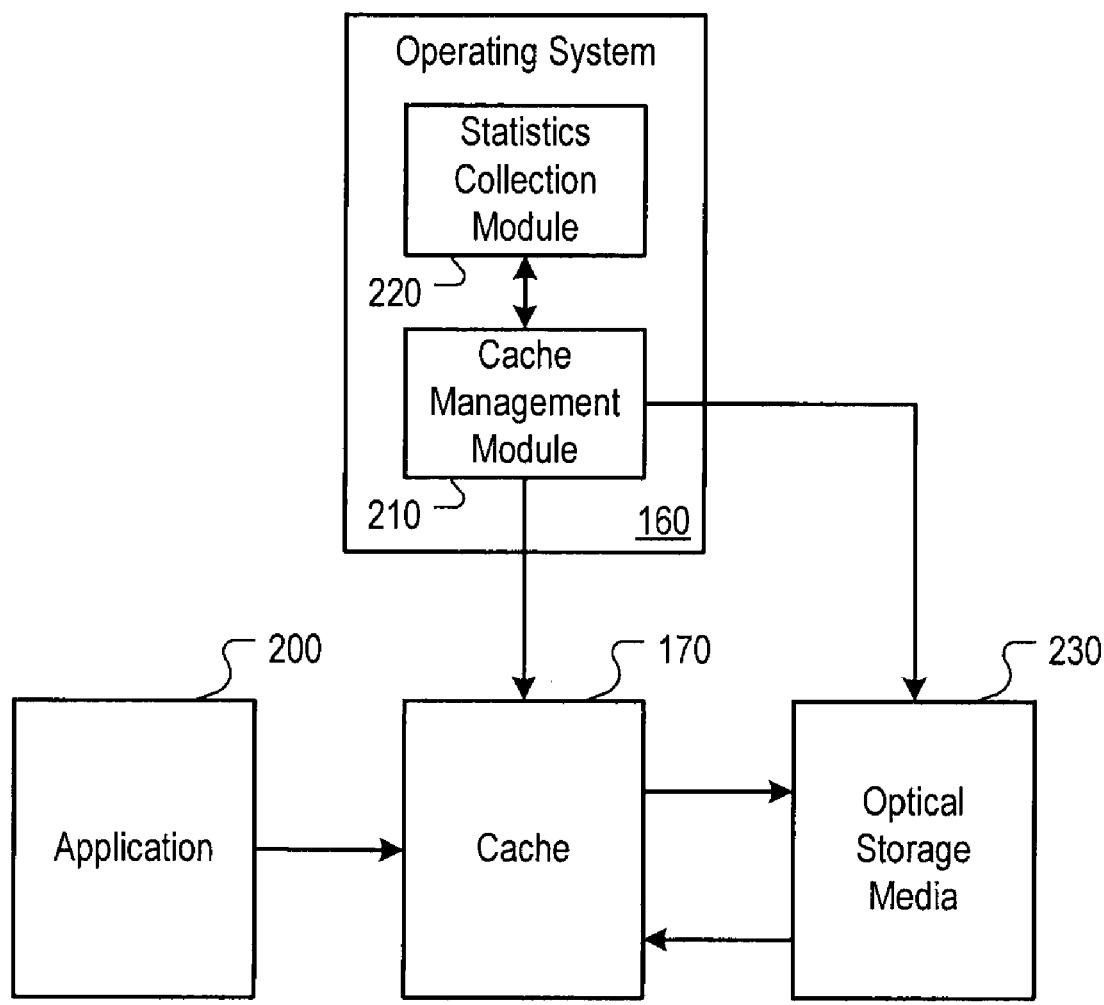
FIG. 2 is a block diagram showing an example operating system that manages a cache using a cache management module.

FIG. 2 shows an example implementation of the operating system 160. The operating system 160 can include a cache management module 210 and a statistics collection module 220 to control the cache 170 and an optical storage media 230. For example, the operating system 160 can use the cache management module 210 and the statistics collection module 220 to determine which file is to be written out from the cache 170 to the optical storage media 230.

In some implementations, the operating system 160 can control retrieval of data from the optical storage media 230. For example, in response to one or more requests for a user data from a software application 200, the operating system 160 can retrieve the user data from the optical storage media 230 and store the retrieved data in the cache 170. In some implementations, the optical storage media 230 can include a write-once, read-many optical media. For example, data written to the optical storage media 230 is not rewritable. In other implementations, the optical storage media 230 can include a write-many, read-many optical media. For example, data written to the optical storage media 230 is rewritable. In some examples, the cache management module 210 can be configured to organize the cache 170 before writing data to the optical storage media 230. Such organization can operate to improve read back performance associated with the data stored in the optical storage media 230.

In some implementations, the cache management and statistics collection modules 210, 220 can operate to organize the cache 170 before writing files to the optical storage media 230. For example, the cache management module 210 and statistics collection module 220 can group pages by the files associated with the pages. In further examples, the cache management module 210 can identify which of the files is most likely to be accessed based upon statistics collected by the statistics collection module 220.

In some implementations, the cache management module 210 can organize the cache 170 to include a set of pages. In some examples, the size of each of the page is fixed and can be an integral multiple of the size of a sector of the optical storage media 230. The cache management module 210 can control the cache 170 so that each of the pages is associated with at most one file. For example, a file can be a user file, a directory, a stream directory, or a named stream.

The statistics collection module 220 can collect statistics for each of the files in the cache 170. In some implementations, the statistics collection module 220 maintains statistics related to file sizes for the files, most recent access times for the files, and file write frequencies for the files. In one implementation, the statistics collection module 220 may maintain a counter value associated with each of the files stored in the cache 170. For example, the counter value may be the number of pages in the cache 170 that is used to store content of the associated file. In one implementation, the statistics collection module 220 can store a time stamp (e.g., a system time) related to the most recent access time for each of the file. For example, the cache management module 210 can use the time stamps as the most recent access time of the associated files. In one implementation, the statistics collection module 220 can compute the file write frequency by counting the number of times that any page of the file is written over a predetermined period of time.

Based on the statistics collected by the statistics collection module 220, the cache management module 210 can assign a score to each of the files in the cache 170. For example, if the cache 170 is full, the cache management module 210 can use the assigned score to determine which of the file is to be removed from the cache 170 and be written out to the optical storage media 230.

As an illustrative example, the operating system 160 receives a request from the application 200 to write some pages of a file that is not currently stored in the cache 170. In some implementations, the cache management module 210 can determine whether the cache 170 has free space to store the pages the application 200 requests to write. If the cache 170 does not currently have the free space, the cache management module 210 can identify one or more of the files currently stored in the cache 170 to be removed based on an assigned score associated with the files. For example, the cache management module 210 can remove files until the cache 170 has the free space for storing the pages the application 200 requests to write.

In some implementations, the cache management module 210 can store the pages removed from the cache in the optical storage media 230. For example, the cache management module 210 can select one or more files to be removed from the cache 170. Then the cache management module 210 can store the selected files to the optical storage media 230 before removing the selected files from the cache 170. In one implementation, the cache management module 210 can retrieve the pages from the optical storage media 230 if the application 200 requests pages that are not in the cache 170. An example of computing the assigned scores is described below.

Figure 3:
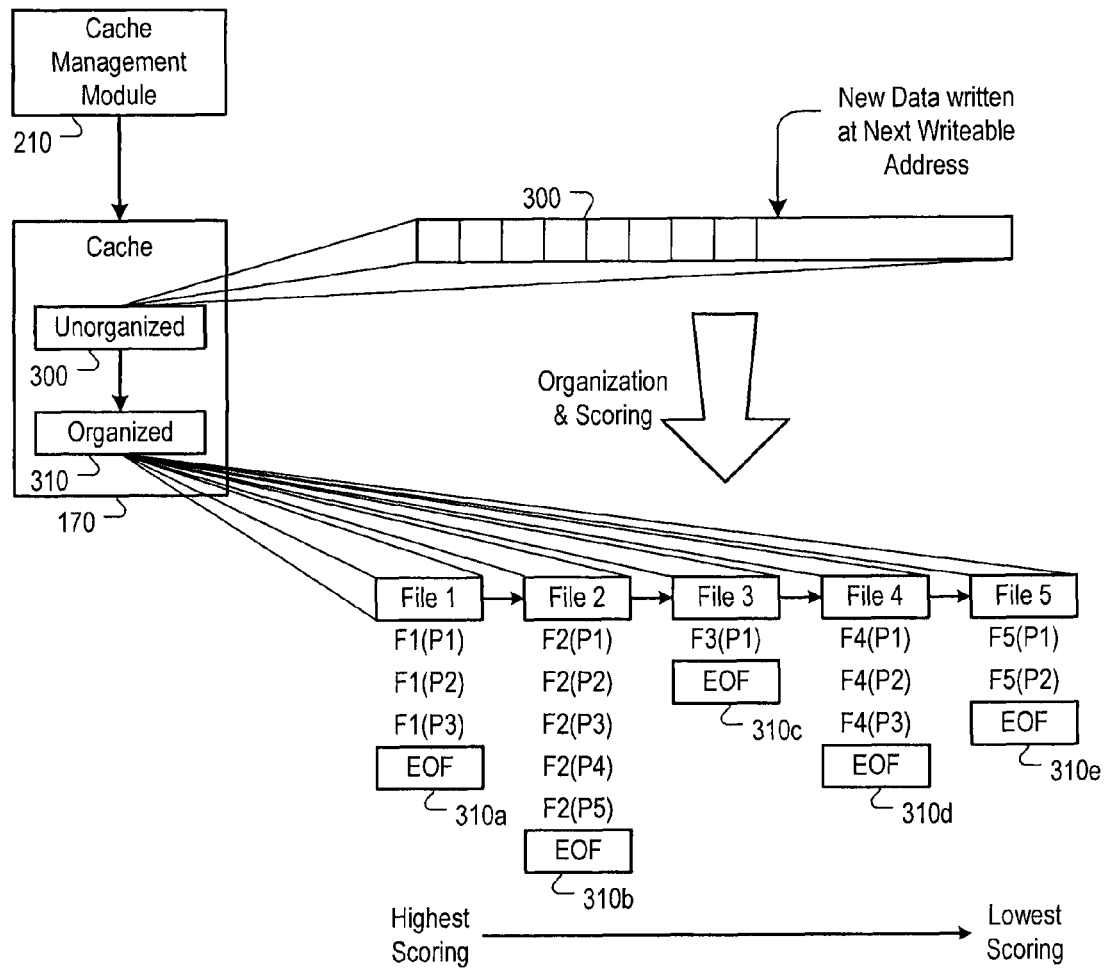
FIG. 3 is a block diagram showing an example organization of a cache.

FIG. 3 shows an example organization operation of the cache 170 using the cache management module 210. In prior art examples, the operating system writes directly to the cache 170 at the next writeable address, giving no consideration to a file to which the new data corresponds, thereby resulting in an unorganized state 300. In some implementations, a cache management module can operate to organize the data in the cache 170 based upon file correspondence and usage statistics, thereby resulting an organized state 310. In other implementations, the operating system can continue to write to the next available address, while the cache management module 210 can operate to organize the data to convert the data from an unorganized state 300 to an organized state 310.

In the unorganized state 300, the cache 170 includes blocks of data as shown as rectangular boxes. For example, new data can be written to the cache 170 at a next writable address with no consideration given to organization cache or to subsequent operations to move the file to an optical storage media. For example, the operating system 160 can store data requested by the application 200 at the next writable address in the cache 170.

The cache management module 210 can arrange the cache 170 from the unorganized state 300 to the organized state 310 by organization and scoring. In this example, the cache 170 stores five files 310a, 310b, 310c, 310d, and 310e. In the organized state 310, the cache management module 210 organizes the cache 170 in a plurality of pages (as labeled as P1, P2, P3, etc. in FIG. 3) to store the files 310a-e. As shown, each of the pages is associated with one file. For example, the pages F1(P1), F1(P2), and F1(P3) are associated with the file 310a. The pages F2(P1), F2(P2), F2(P5), F2(P4), and F2(P5) are associated with the file 310b. The page F3(P1) is associated with the file 310c. The pages F4(P1), F4(P2), and F4(P3) are associated with the file 310d. The pages F5(P1), and F5(P2) are associated with the file 310e. Note that although some pages have the same page number, such as F2(P1) and F3(P1), these pages are actually corresponding different pages in the cache 170.

As shown in FIG. 3, each of the files 310a-e can be stored in the cache using a page order based on the order of the pages associated with the files 310a-e. For example, pages 1, 2, 3 associated with the file 310a is stored in pages 1 (F1(P1)), 2 (F1(P2)), and 3 (F1(P3)) in the cache 170. For example, F1(P1) may contain the beginning of file 1 and F1(P3) may contain the end of file 1.

For each of the files 310a-e, the cache management module 170 can assign a score based on collected statistics related to the files 310a-e. In some implementations, the cache management module 170 can combine the statistics related to the most recent access time, a write frequency, and a file size associated with the respective files.

In some implementations, the cache management module 210 can derive an order associated with the files based upon access time. For example, the cache management module 210 can determine the order of the files from the most recently accessed to the least recently accessed. In one implementation, the cache management module 210 can assign an access time score to each of the files based on the sorted order of the files. For example, if there are N files, the cache management module 210 can assign the access time score using the equation $(k-1)/N$, where k is the order of the file. For example, the cache management module 210 can assign the most recently accessed file a score of 0 and the second most recently accessed file a score of $1/N$. For example, cache management module 210 can assign the least recently accessed file a score of $(N-1)/N$.

Similarly, in some implementations, the cache management module 210 can derive an order associated with the files based on average write frequencies. For example, the cache management module 210 can derive an order from the file with the highest average write frequency to the lowest average write frequency. The files can then be assigned write frequency scores based upon the order. For example, the cache management module 210 can assign write frequency scores of $0, 1/N, 2/N, \ldots, (N-1)/N$, respectively, to each of the files based upon the derived order of the files.

The cache management module 210 can derive an order of the files based upon the file size of the files. For example, the cache management module 210 can compare the file sizes of the files based on the number of pages each files occupies in the cache 170. For example, a file occupying five cache pages is considered to be larger than another file occupying three cache pages. In some implementations, the cache management module 170 can derive an order associated with the files 310a-e from the least number of pages to the most number of pages. In the example of FIG. 3, a sorted order of the files 310a-e may be file 3, file 5, file 1, file 4, and file 2. Next, the cache management module 210 can assign a file size score to the files 310a-e based upon the derived order. The cache management module 210 can assign the scores $0, 1/N, 2/N, \ldots,$ and $(N-1)/N$ to the first file, the second file, the third file, $\ldots$, and the last file, respectively. In this example, the cache management module 170 assigns the file size scores 0 to file 3, 0.2 to file 5, 0.4 to file 1, 0.6 to file 4, and 0.8 to file 2. Note that for files of the same size (e.g., file 1 and file 4), the order among them can be random. In this example, file 4 can be assigned a score of 0.4 and file 1 can be assigned a score of 0.6. Other implementations of scoring systems can be used.

In various implementations, the cache management module 210 can determine a combined score of the files 310a-e by combining each of the file size score, the write frequency score and the last access time score. In some implementations, the cache management module 210 can determine a weighted sum of the last access time score, the write frequency score, and the file size score. For example, the cache management module 210 can assign weights to each of the score categories. In one implementation, the cache management module 210 can assign a weight of 0.4 to the access time score, a weight of 0.4 to the write frequency score, and a weight of 0.2 to the file size score. Thus, the cache management module 210 can determine the combined score according to an equation: $S = S_{at}W_{at} + S_{wf}W_{wf} + S_{fs}W_{fs}$, where S is the combined score, $S_{at}$ is the access time score, $W_{at}$ is the weight of the access time score, $S_{wf}$ is the write frequency score, $W_{wf}$ is the weight of the write frequency score, $S_{fs}$ is the file size score, and $W_{fs}$ is the weight of the file size score.

As an example, suppose the file 310c is assigned an access time score of 0.4, a write frequency score of 0.8, and a file size score of 0. If the cache management module 210 assigns that the weights of the access time score, the write frequency score, and the file size score are 0.4, 0.4, and 0.2, respectively, then the combined score of the file 310c is:

$$S = 0.4 \times 0.4 + 0.8 \times 0.4 + 0.0 \times 0.2 = 0.48.$$

Based on the combined scores to the files 310a-e, the cache management module 210 can sort the files 310a-e from the highest combined score to the lowest combined score. In the depicted example in FIG. 3, the highest scored file is the file 310a and the lowest scored file is the file 310e. In some implementations, the highest scored file can be moved to an optical storage media first, followed by lower scoring files.

In some implementations, the cache management module 210 can determine whether the cache 170 is above a threshold usage level before moving files to an optical storage media. In other examples, the cache management module 210 can determine whether the cache 170 is above a threshold usage level before determining whether to stop moving files from the cache 170 to the optical storage media. In various examples, the threshold usage level may be a percentage (e.g., 85%, 90%, or 95%) of the total storage size of the cache 170.

Figure 4:
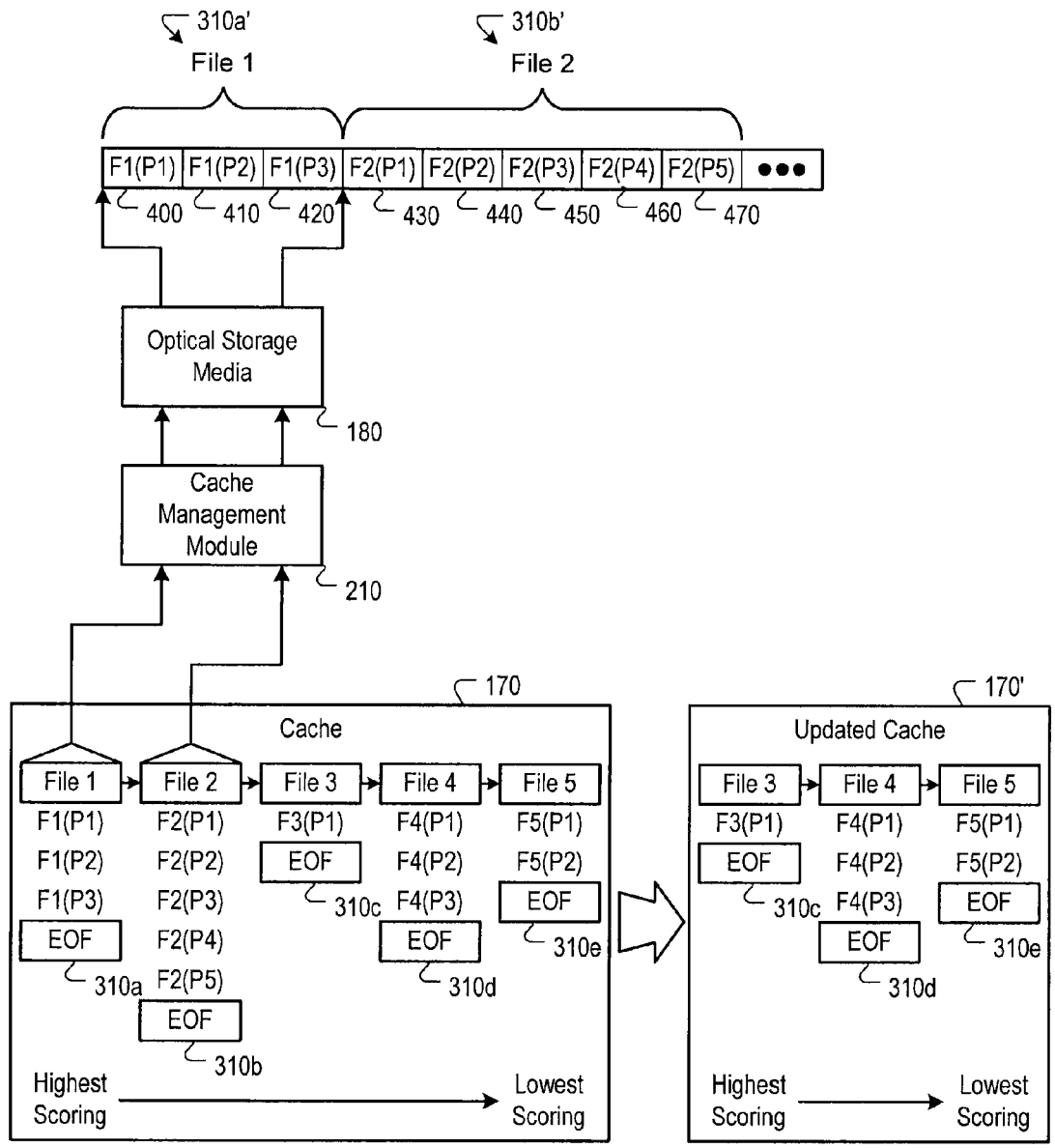
FIG. 4 is a block diagram showing an example operation to store part of a cache to an optical storage media.

FIG. 4 is a block diagram showing an example of moving a portion of the cache (files 1 and 2) to the optical storage media 230. For example, the cache management module 210 can operate to store the highest scored files to the optical storage media 230 if the cache management module 210 determines that the cache 170 is full. In one example, the cache 170 is determined to be full if excess memory space is required to store an addition requested data requested by the application 200. In another example, the cache 170 is determined to be full if the cache 170 is above the threshold usage level. After determining that the cache is full or is above the threshold usage level, the cache management module 210 can identifies and move the highest scored file to the optical storage media 230.

As shown, the optical storage media 230 can include sectors 400, 410, 420, 430, 440, 450, 460, 470. For example, the cache management module 210 can write the files to the optical storage media 230 in UDF. In some implementations, the size of the sectors 400, 410, 420, 430, 440, 450, 460, 470 may be identical to the size of the pages in the cache 170. For example, the cache management module 210 can store one page of data from the cache 170 in a sector of the optical storage media 230.

In this example, the cache management module 210 can sequentially store file 1, which has a file size of three pages, in the sectors 410, 420, 430. In some implementations, the cache management module 210 can store a file in the optical storage media based on a page order associated with the file. As shown, file 1 is stored in the sectors 400, 410, 420 according to the page order so that a page 1 of the file 1 (F1(P1)) is stored in the sector 400, a page 2 of the file 1 (F1(P2)) is stored in the sector 410, and a page 3 of the file 1 (F1(P3)) is stored in the sector 420.

In some implementations, the cache management module 210 can determine whether another file is to be stored in the optical storage media 230. For example, if the cache management module 210 determines that more free space is required in the cache 170, then the cache management module 210 determines to store another file to the optical storage media 230. The cache management module 210 then selects to remove the highest scored file remaining in the cache 170. As shown, the cache management module 210 selects to remove file 2 after file 1 is removed from the cache 170 because file 2 is the second highest scored file. In this example, file 2 is sequentially stored in the sectors 430, 440, 450, 460, 470. Subsequently, the cache management 210 can remove the file 2 from the cache 170. In some examples, the cache management module 210 can repeat the above process until the required free space is obtained.

FIG. 4 shows an updated cache 170' after files 1 and 2 are stored on the optical storage media. The free space obtained by removing files 1 and 2 can be used to store other data for the application 200.

In some implementations, after receiving a request for a page associated with the file 1 or the file 2, the cache management module 210 can read the file associated with the requested page into the cache 170' from the optical storage media 230 based on the request. In some examples, since the files are written sequentially in the sectors 400, 410, 420, 430, 440, 450, 460, 470 of the optical storage media 230, the workload for reading back the files from the optical storage media is substantially reduced.

Figure 5:
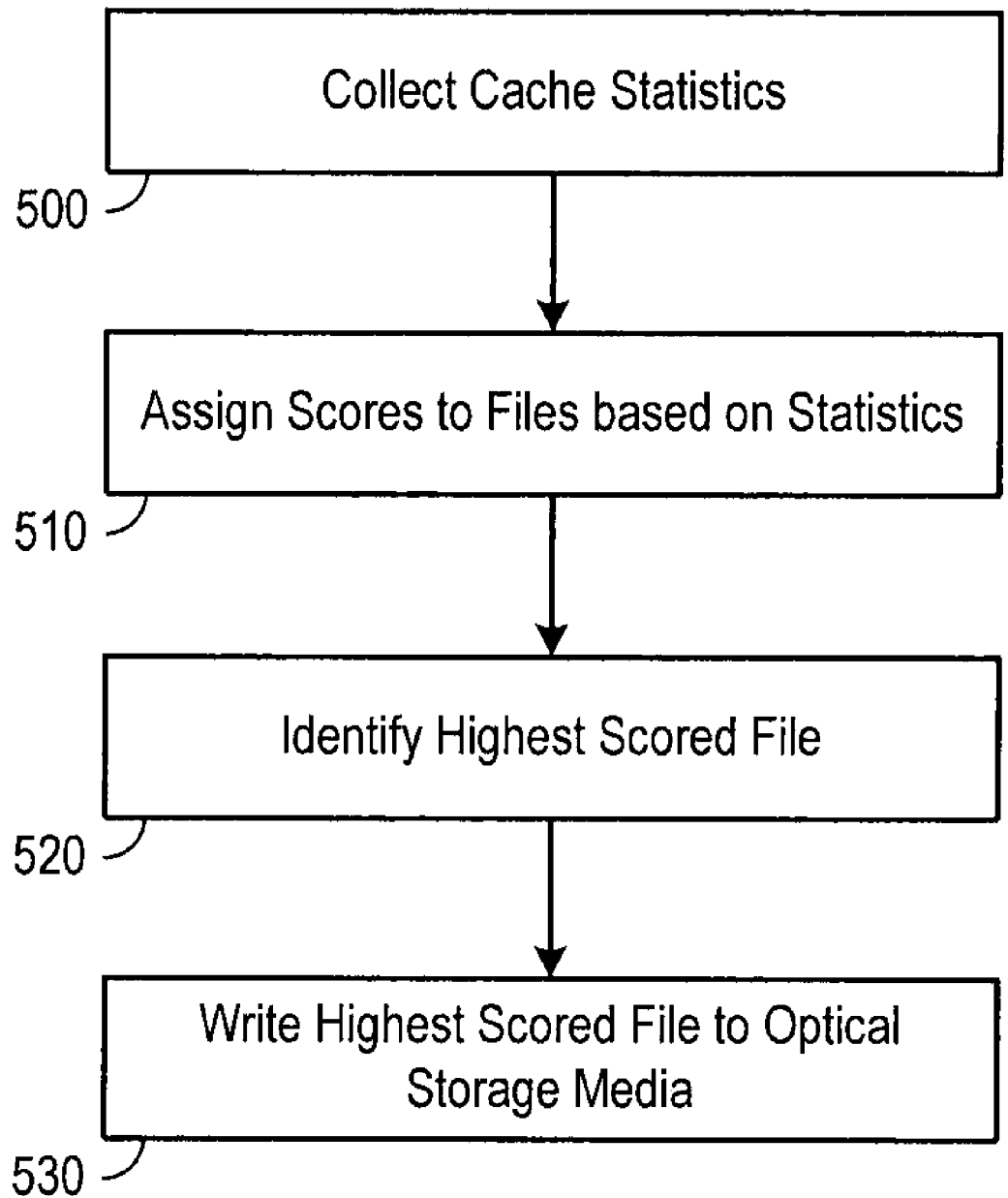
FIG. 5 is a flowchart of an example method for cache management.

FIG. 5 is a flowchart of an example method for cache management. For example, the method shown in FIG. 5 can be performed by a processor (e.g., the processor 110 in FIG. 1) that executes the operating system 160. The method begins at stage 500 with collecting cache statistics. Cache statistics can be collected, for example, by a statistics collection module (e.g., statistics collection module 220 of FIG. 2). In various examples, the statistics collection module can collect statistics, such as a most recent access time, a write frequency, and a file size, related to the files stored in the cache 170.

At stage 510, scores can be assigned to files based on the collected statistics. Scores can be assigned, for example, by a cache management module (e.g., cache management module 210 of FIG. 2). In various examples, the cache management module can sort the files based on the statistics and assign scores to each of the files based on a ranking of the file in each of the collected statistics. For example, the cache management module can combine the assigned scores for each of the files using a weighted function for each of the respective scores.

Next, the highest scored file is identified at stage 520. The highest scored file can be identified, for example, by a cache management module (e.g., cache management module 210 of FIG. 2). The cache management module can sort the files stored in the cache 170 according to the combined scores of the files, from the highest scored file to the lowest scored file.

At stage 530, the highest scored file can be written to an optical storage media. The highest scored file can be written to an optical storage media, for example, by a cache management module (e.g., cache management module 210 of FIG. 2). For example, if the cache management module determines that the cache (e.g., cache 170 of FIG. 2) is full, then the cache management module can select and write the highest scored file to the optical storage media 230 and subsequently remove the file from the cache 170 to obtain free space for the cache 170.

A number of implementations have been described. Nevertheless, it will be understood that various modifications may be made. For example, elements of one or more implementations may be combined, deleted, modified, or supplemented to form further implementations. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   a cache operable to store a plurality of pages; and
   a processor configured to perform operations comprising:
   associating each of the plurality of pages with a particular file from a plurality of files, the plurality of files being stored on a first non-transitory storage medium;
   collecting statistics on each of the plurality of files, the statistics including a number of pages associated with the file, a most recent access time associated with the file, and a file write frequency of the file;
   assigning a score to each of the files based upon the collected statistics associated with the files; and
   writing one or more files to a second non-transitory storage medium based upon the scores assigned to each of the files.

2. The system of claim 1, the operations comprising organizing the cache based upon the scores associated with each of the files.

3. The system of claim 1, the operations comprising retrieving files stored on the second non-transitory storage medium upon receiving a request from an application for the file.

4. The system of claim 1, the operations comprising writing the one or more files to the second non-transitory storage medium responsive to determining that the cache is full.

5. The system of claim 1, wherein writing the one or more files to the second non-transitory storage medium comprises writing the one or more files in a universal disk format.

6. The system of claim 1, wherein writing one or more files to the second non-transitory storage medium based upon the scores assigned to each of the files comprises writing one or more highest scored file to the second non-transitory storage medium.

7. The system of claim 1, wherein writing the one or more files to the second non-transitory storage medium the file to the second non-transitory storage medium in a page order associated with each of the one or more file.

8. The system of claim 7, wherein the page order is determined based upon an order of the pages associated with the one or more files.

9. The system of claim 1, wherein a page size associated with each of the plurality of pages is an integral multiple of a sector size on the non-transitory storage medium.

10. A computer-implemented method comprising:
collecting statistics on each of a plurality of files, each file being stored on a first non-transitory storage medium and being associated with one or more pages, each page being a page of a cache, the statistics on each file comprising a number of pages associated with the file, a most recent access time associated with the file, and a file write frequency;
assigning a score to each of the plurality of files based upon the statistics on the file; and
identifying a highest scored file based upon the scores associated with each of the plurality of files; and
writing the highest scored file to a second non-transitory storage medium.

11. The computer-implemented method of claim 10, comprising calculating the score to each of the plurality of files based upon a respective weighting associated with each of the statistics.

12. The computer-implemented method of claim 10, further comprising determining that the cache is full prior to identifying the highest scored file and writing the highest scored file to the second non-transitory storage medium.

13. The computer-implemented method of claim 10, further comprising determining that the cache is above a threshold usage level.

14. The computer-implemented method of claim 10, further comprising determining whether the cache is above a threshold usage level after the highest scored file is written to the second non-transitory storage medium.

15. The computer-implemented method of claim 10, wherein if the cache is above a threshold usage level after the highest scored file is written to the second non-transitory storage medium:
identifying a next highest scored file based upon the scores associated with each of the plurality files;
writing the next highest scored file to the second non-transitory storage medium; and
repeating the identifying and writing until the cache is below the threshold usage level.

16. The computer-implemented method of claim 10, further comprising organizing the cache based upon the scores associated with each of the plurality of files.

17. The computer-implemented method of claim 10, further comprising:
receiving a request for a page associated with a file stored on the second non-transitory storage medium; and
retrieving the file stored on the second non-transitory storage medium based upon the request.

18. The computer-implemented method of claim 10, wherein writing the highest scored file to the second non-transitory storage medium comprises writing the file using a universal disk format.

19. The computer-implemented method of claim 10, further comprising writing the pages associated with the highest scored file to the second non-transitory storage medium in a page order associated with the file.

20. The computer-implemented method of claim 10, wherein the statistics on each file comprises a page size associated with each of the plurality of pages, the page size being an integral multiple of a sector size on the second non-transitory storage medium.

21. The computer-implemented method of claim 10, wherein the second non-transitory storage medium includes an optical storage medium.

22. One or more non-transitory computer readable media having stored thereon software program code operable to cause a processor to perform operations comprising:
collecting statistics on each of a plurality of files, each file being stored on a first non-transitory storage medium and being associated with one or more pages, each page being a page of a cache, the statistics on each file comprising a number of pages associated with the file, a most recent access time associated with the file, and a file write frequency;
assigning a score to each of the plurality of files based upon the statistics on the file; and
identifying a highest scored file based upon the scores associated with each of the plurality of files; and
writing the highest scored file to a second non-transitory storage medium.

23. The computer readable media of claim 22, wherein the second non-transitory storage medium includes an optical storage medium.

24. A method, comprising:
storing a plurality of pages in a cache;
associating each of the plurality of pages with a particular file from a plurality of files, the plurality of files being stored on a first non-transitory storage medium;
collecting statistics on each of the plurality of files, the statistics including a number of pages associated with the file, a most recent access time associated with the file, and a file write frequency of the file;
assigning a score to each of the files based upon the collected statistics associated with the files; and
writing one or more files to a second non-transitory storage medium based upon the scores assigned to each of the files, wherein the method is performed by one or more processors.

25. One or more non-transitory computer readable media having stored thereon software program code operable to cause a processor to perform operations comprising:
storing a plurality of pages in a cache;
associating each of the plurality of pages with a particular file from a plurality of files, the plurality of files being stored on a first non-transitory storage medium;
collecting statistics on each of the plurality of files, the statistics including a number of pages associated with the file, a most recent access time associated with the file, and a file write frequency of the file;
assigning a score to each of the files based upon the collected statistics associated with the files; and
writing one or more files to a second non-transitory storage medium based upon the scores assigned to each of the files.

* * * * *